United States Patent [19]

Nalodka et al.

[11] 3,782,221
[45] Jan. 1, 1974

[54] ADJUSTABLE TIE ROD LINK

[75] Inventors: Edward C. Nalodka, Dearborn Heights; Thomas R. Street, Taylor, both of Mich.

[73] Assignee: Ford Motor Company, Dearborn, Mich.

[22] Filed: Dec. 5, 1972

[21] Appl. No.: 312,403

[52] U.S. Cl. .................................. 74/586, 287/64
[51] Int. Cl. ............................................. F16c 7/06
[58] Field of Search.............. 74/586; 287/64, 103 R

[56] References Cited
UNITED STATES PATENTS
3,419,843  12/1968  Hays ................................. 287/64 X
3,617,078  11/1971  Valukonis ......................... 74/586 X Primary Examiner—Charles J. Myhre
Assistant Examiner—F. D. Shoemaker
Attorney—Keith L. Zerschling et al.

[57] ABSTRACT

An adjustable tie rod assembly for a motor vehicle steering linkage system is constructed in accordance with one embodiment of the invention by providing transverse serrations near the ends of each of two rod parts. Each rod has an end portion that is bent 90 degrees to its serrated portion and each bent end is provided with screw threads. Each rod has an axially extending slot disposed inwardly of its serrated portion. The two rods are assembled by extending the bent end of each rod through the slot of the other rod so that the serrated portions are placed in face-to-face relationship. A soft metal shim is interposed between the two serrated portions. The rods are then adjusted axially for length and nuts are tightened on the threaded ends so that the serrated portions bite into the soft metal shim and lock the two rods together to form an assembly of fixed length.

11 Claims, 2 Drawing Figures

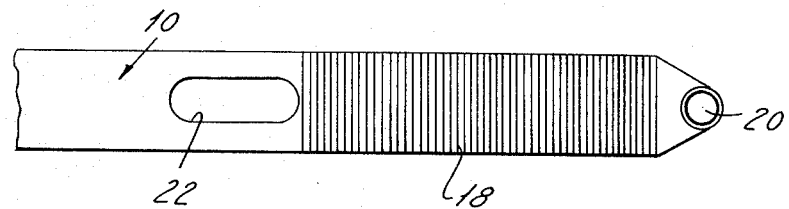
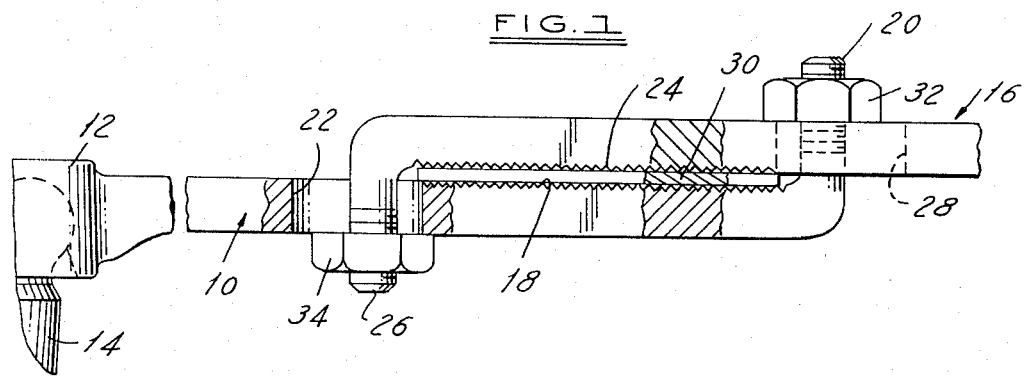

ADJUSTABLE TIE ROD LINK

BACKGROUND OF THE DISCLOSURE

This invention relates generally to tie rod assemblies for vehicle steering linkage systems, and more particularly to an improved adjustment means therefor.

Tie rod assemblies conventionally employ so-called turnbuckle adjustment means in which opposite hand, internal threads are formed on opposite ends of a sleeve member which threadably engage corresponding threads on associated rod elements. Adjustment of the overall length of such a tie rod assembly is accomplished by rotating the sleeve in an appropriate direction in the manner of a turnbuckle. When the desired length is obtained, the sleeve is secured by a clamping means which contracts the sleeve about the rod elements.

While adjustment means of the turnbuckle type perform adequately in initially adjusting and maintaining the desired degree of wheel toe-in in a vehicle suspension and steering linkage arrangement, in some cases space limitation may be critical to the extent that random rotational positioning of the turnbuckle structure may cause interference between the locking bolts of the clamping means and the adjacent portions of the vehicle chassis. In addition, such a construction involves a multiplicity of threaded elements complicated by the necessity of applying both left- and right-hand threads.

BRIEF SUMMARY OF THE DISCLOSURE

In view of the difficulties as outlined above with respect to conventional prior art constructions, it is the principal object of the present invention to provide a simple, inexpensive adjustable linkage mechanism for tie rod assemblies for vehicle steering linkage systems.

In the presently preferred embodiment of this invention, a tie rod assembly comprises first and second rod parts or elements having mating ends. Each rod has a serrated portion and an end bent at a 90 degree angle. Screw threads are formed on the bent ends. An axially extending slot is formed in each rod inwardly of its serrated portion.

The two rods are placed together with a threaded bent end of each rod extending through the slot in the other rod. This arrangement places the serrated portions in juxtaposed relationship. A soft metal insert is interposed between the two adjacent serrated portions. The two rods are then adjusted for axial length. Nuts are placed on the threaded ends of the rods and tightened so that the serrated portions bite into the soft metal insert. The two rods are thereby rigidly secured together to form a rigid assembly of desired length.

DETAILED DESCRIPTION OF THE DRAWINGS

The many objects and advantages of the present invention will become apparent upon consideration of the following detailed description and the accompanying drawings, in which:

FIG. 1 is a side elevational view, partly in section, of an adjacent tie rod linkage cnstructed in accordance with this invention; and FIG. 2 is a top plan view of one of the rods of FIG. 1.

DETAILED DESCRIPTION OF THE PREFERRED EMBODIMENT

Referring now to the drawings for a more detailed description of the present invention, FIG. 1 discloses a tie rod assembly for use in an automotive steering linkage system. The assembly includes a first rod 10 that is connected to the socket portion 12 of a ball and socket joint. The joint includes a ball stud member 14 and it will be understood that the ball stud 14 is constructed to be connected to the associated components of a steering linkage system in a conventional manner.

The tie rod assembly also includes a second rod 16 which is constructed to be connected to the first rod 10. The second rod 16 is also constructed to be connected to steering linkage components.

The rod 10 has a generally rectangular shape in cross section and is formed with a series of transversely extending serrations 18. The end 20 of the rod is bent at a 90 degree angle to the serrated portion 18 and is formed with screw threads. An axially extending slot 22 is provided in the rod 10 adjacent to the inner end of the serrated portion 18.

Rod 16 is constructed in a similar manner. It includes a serrated portion 24 and a bent end 26 that is formed outwardly of the serrations. The serrated portion of rod 16 has a rectangular shape in cross section. The rod end 26 is provided with screw threads. An axially extending slot 28 is formed in the rod 16 adjacent to the inner end of its serrated portion 24.

OPERATION

After the rods 10 and 16 are assembled in the steering linkage system, the rod ends 20 and 26 are arranged in protruding fashion through the slots 28 and 22, respectively. This places the serrated portions 18 and 24 in face-to-face relationship. A soft metal strip 30 is interposed between the serrated portions 18 and 24. Threaded nuts 32 and 34 are placed on the ends 20 and 26 of the rods 10 and 16, respectively.

The rods 10 and 16 are then adjusted for length as required by the particular steering linkage system in which they are installed. The axially extending slots 22 and 28 permit axial displacement of one rod with respect to the other rod.

When the two rods 10 and 16 are adjusted for length, the nuts 32 and 34 are tightened by a wrench causing the serrated portions 18 and 24 to bite into the soft metal insert 30. The engagement of the serrations of the portions 18 and 24 with the soft metal insert 30 locks the rods 10 and 16 together to form a rigid interconnection.

If it is desired to make subsequent adjustments in the assembly, it is merely necessary to loosen the nuts 32 and 34 and relocate the rods 10 and 16 with respect to one another as desired. The nuts 32 and 34 are then retightened causing the serrations 18 and 24 to take renewed gripping engagement with the soft metal insert 30.

A tie rod adjustment in accordance with this invention has the advantages that it is of simple construction and requires unsophisticated tools for adjustment purposes. The overlapping relationship of the rod ends provides an assembly of exceptional bending strength.

The foregoing description presents the presently preferred embodiment of the invention. Modifications and alterations may occur to those skilled in the art which

We claim:

1. An adjustable rod assembly comprising a first rod, a second rod and means constructed to secure said rods together,
    said rods having juxtaposed gripping portions,
    the end of each of said rods being formed with a threaded portion extending at a 90 degree angle to its said gripping portion,
    an axially extending slot formed in each of said rods,
    each of said rods having its said threaded portion extending through said slot of the other of said rods,
    a nut positioned on each of said threaded portions and constructed to be tightened to secure said rod ends together.

2. An adjustble rod assembly according to claim 1 and including:
    said gripping portions each comprising a series of transversely extending serrations.

3. An adjustable rod assembly according to claim 1 and including:
    deformable means interposed between said gripping portions,
    said deformable means being constructed to be deformed by said gripping portion when said nuts are tightened.

4. An adjustable rod assembly according to claim 1 and including:
    said gripping portions each comprising a series of transversely extending serrations,
    plastically deformable means interposed between said gripping portions,
    said plastically deformable means being constructed to be deformed by said serrations when said nuts are tightened.

5. An adjustable tie rod assembly for a steering linkage system comprising:
    a first rod constructed to be connected to a component of said steering linkage system and having a gripping portion with an irregular gripping surface,
    said first rod having an end portion extending at a generally 90 degree angle to said gripping portion,
    an axially extending slot in said first rod situated inwardly of said gripping portion,
    a second rod constructed to be connected to a component of said steering linkage system and having a gripping portion with an irregular gripping surface,
    said second rod having an end portion extending at a generally 90 degree angle to its said gripping portion,
    an axially extending slot formed in said second rod inwardly of said gripping portion,
    said first and second rods being assembled with said end portion of said first rod extending through said slot of said second rod and said end portion of said second rod extending through slot of said first rod,
    fastening means positioned on said end portions of said first and second rods and constructed to be tightened to clamp said first and second rods together.

6. An adjustable tie rod assembly for a steering linkage system according to claim 5 and including:
    a deformable insert interposed between the gripping portions of said first and second rods,
    said insert being deformed when said first and second rods are secured together by said fastening means.

7. An adjustable tie rod assembly for a steering linkage system according to claim 5 and including:
    a plastically deformable insert interposed between the gripping portions of said first and second rods,
    the surfaces of said insert adjacent said gripping portions being constructed to be deformed when said first and second rods are secured together by said fastening means.

8. An adjustable tie rod assembly for a steering linkage system according to claim 5 and including:
    a plastically deformable soft metal insert interposed between the gripping portions of said first and second rods,
    the surfaces of said soft metal insert adjacent to said gripping portions being constructed to be plastically deformed when said first and second rods are secured together by said fastening means.

9. An adjustable tie rod assembly for a steering linkage system comprising:
    a first rod constructed to be connected to a component of said steering linkage system and having a gripping portion with an irregular gripping surface,
    said first rod having an integral end portion extending at a generally 90 degree angle to said gripping portion,
    said integral end portion in said first rod having screw threads,
    an axially extending slot in said first rod situated inwardly of said gripping portion,
    a second rod constructed to be connected to a component of said steering linkage system and having a gripping portion with an irregular gripping surface,
    said second rod having an integral end portion extending at a generally 90 degree angle to its said gripping portion,
    said integral end portion of said second rod having screw threads,
    an axially extending slot formed in said second rod inwardly of said gripping portion,
    said first and second rods being assembled with said integral end portion of said first rod extending through said slot of said second rod and said integral end portion of said second rod extending through slot of said first rod,
    nut means positioned on said integral end portions of said first and second rods and constructed to be tightened to clamp said first and second rods together.

10. An adjustable tie rod assembly for a steering linkage system according to claim 9 and including:
    deformable means interposed between said gripping portions of said first and second rods,
    said deformable means being constructed to be deformed by said gripping portions when said nuts are tightened.

11. A tie rod assembly for a steering linkage system according to claim 9 and including:
    a plastically deformable soft metal insert interposed between the gripping portions of said first and second rods,
    the surfaces of said soft metal insert adjacent to said gripping portions being constructed to be plastically deformed by said gripping portions when said nuts are tightened.

* * * * *